United States Patent Office 3,152,299
Patented Oct. 6, 1964

3,152,299
TRANSISTORIZED POWER CONTROL CIRCUITS
Thomas F. Leney, Buffalo, N.Y., assignor to Sylvania
Electric Products Inc., a corporation of Delaware
Filed Aug. 23, 1960, Ser. No. 51,454
2 Claims. (Cl. 323—22)

This invention relates generally to electrical circuits and more particularly to means for regulating the amplitude of alternating current power using transistors as the controlling elements.

Heretofore, it has been the practice in the regulation of alternating current to use thyratrons or saturable reactors as the controlling elements. With either of these devices, load current flows in bursts rather than during the complete cycle, giving rise to undesirable transients. Vacuum tubes are generally undesirable, under the vibration and shock conditions and of environment encountered in modern electronic circuit applications, and because of their large size. Saturable reactors, although more rugged than tubes, inherently present stability problems. Due to their magnetic core, many design problems must be overcome, such as hysteresis losses, temperature variations and transient effects. Saturable reactors are also relatively heavy and bulky, characteristics which limit their applicability in modern aeronautical and space vehicle applications.

It is a primary object of the present invention to provide means for regulating the amplitude of alternating current power using transistors as the controlling elements.

Another object of the invention is to provide means for regulating the amplitude of alternating current power with a direct current control signal and wherein the regulated current flows during the complete cycle.

Another object of the invention is to provide a rugged circuit of minimum size and weight for regulating the amplitude of alternating current power.

In accordance with the present invention, the foregoing and other related objects are attained in a full-wave regulater which is controllable in response to a direct current signal. The circuit includes a network of two transistors and four diodes connected to one side of an alternating current (A.C.) source so arranged that load current flows during the complete cycle. The amplitude of A.C. power applied to a load is regulated by controlling the collector-emitter impedance of the two transistors by a D.C. signal applied to the base electrodes of the transistors. With a sine wave input, the wave shape of the load current approaches that of a sine wave. The simplicity of control of the circuit renders it useful in power supply regulation or in any application requiring alternating current power of variable amplitude.

Figure 1:
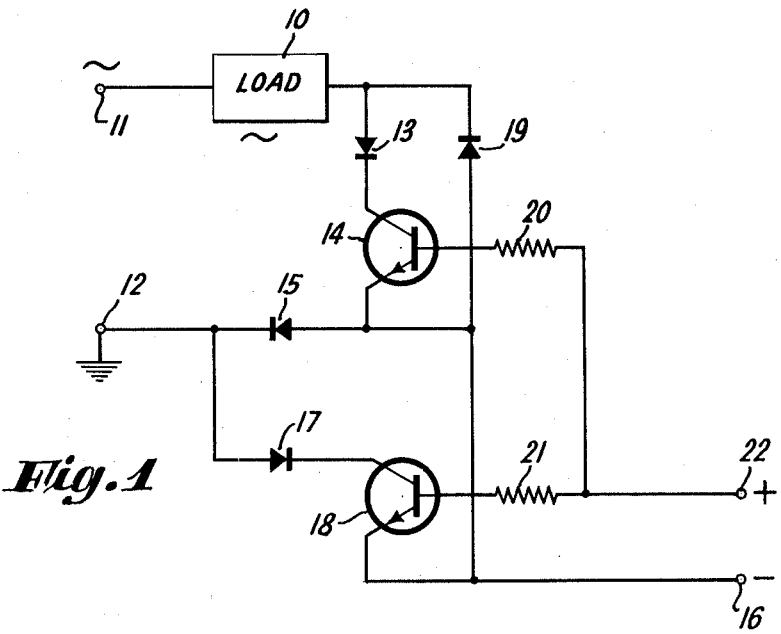
Figure 2:
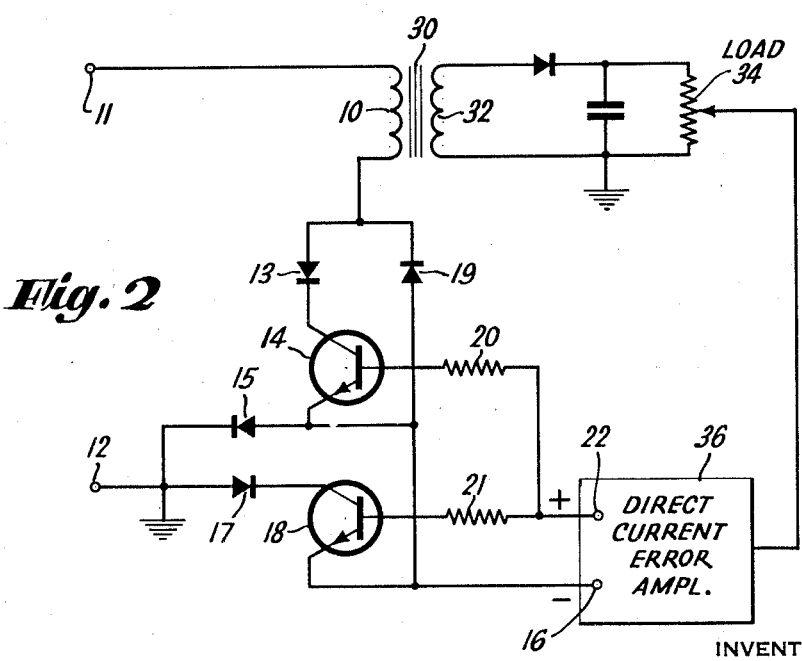

Other objects and features of the invention and a better understanding of its operation will be apparent from the following description, reference being had to the accompanying drawing in which:

FIG. 1 is a schematic circuit diagram of the power control circuit of the invention; and FIG. 2 is a circuit diagram of a voltage regulating circuit incorporating the invention.

Referring to FIG. 1 of the drawing, the invention is illustrated in association with a load 10, which may be the primary winding of a transformer, which is connected in series between one terminal 11 of a source of single-phase alternating current voltage and through the transistorized power control circuit of the invention to the other terminal 12 of the source, which may be grounded. The conduction path of the control circuit for one half-cycle of the input power comprises a diode 13, an NPN transistor 14, and a diode 15 connected in series between the load 10 and the grounded terminal 12. The collector of transistor 14 is connected to the cathode of diode 13, and its emitter is connected to the anode of diode 15, and to the negative terminal 16 of a source of direct current control signal for forward biasing the emitter relative to the base and collector. Terminal 16 is the low side of the source of direct current control signal and must be isolated from A.C. ground in the illustrated arrangement in which one terminal of the A.C. source is grounded.

The conduction path for the other half cycle consists of a diode 17, an NPN transistor 18, and a diode 19 connected in series in that order between terminal 12 and the load 10. The collector of transistor 18 is connected to the cathode of diode 17, and its emitter is connected to the anode of diode 19 and to negative terminal 16, to assure that it is forward biased with respect to the base and collector. Thus, it will be seen that the conduction paths for successive half cycles of the input wave are in parallel between the load 10 and terminal 12, and are identical except for the opposite polarities of diodes 15 and 17 and 13 and 19.

Control of the amplitude of the alternating current power applied to load 10 is achieved by similarly varying the impedance of the base-emitter circuit of transistors 14 and 18 so as to vary in like manner the impedances of the parallel conduction paths. To this end, the base electrodes of transistors 14 and 18 are respectively connected through resistors 20 and 21 to the positive terminal 22 of the source of the direct current control signal. The breakdown voltage from collector to emitter of a transistor being inversely proportional to the resistance of the base-emitter circuit, the value of resistors 20 and 21 are of relatively low value to assure a high collector to emitter breakdown voltage. A low value for these resistors also minimizes the range of voltage required to control the transistors. It will of course be understood that the transistors and diodes are selected to be capable of handling the voltage of the source and the current requirements of the load 10.

In operation, when terminal 11 of the A.C. source is positive, current flows through load 10, diode 13, through the collector-emitter path of transistor 14, and diode 15 to terminal 12. Conversely, when terminal 11 is negative relative to terminal 12, current flows through diode 17, through the collector-emitter path of transistor 18, through diode 19, and through the load 10 to terminal 11. Diodes 19 and 17 protect the transistors against emitter-collector inverse breakdown when terminal 11 is positive, and diodes 15 and 13 protect the transistors against emitter to collector inverse breakdown when terminal 11 is negative. Protective diodes are required for each collector and each emitter since equal base currents are continuously applied to both transistors.

Control of the amplitude of the alternating current power applied to load 10 is accomplished in the following manner: The D.C. voltage across terminals 22 and 16 is applied in parallel across the base-emitter circuits of the two control transistors, the impedances of which are designed to be equal so that the base currents in each will be equal. By controlling the D.C. voltage across terminals 22 and 16, the base current through transistors 14 and 18, and hence the impedance of the collector-emitter path of each transistor, is varied proportionately. Since the collector-emitter path of transistor 14 represents a series impedance in the load circuit during the half cycle in which terminal 11 is positive, and the collector-emitter path of transistor 18 represents a series impedance in the load circuit during the half cycle in which terminal 11 is negative, adjustment of the D.C. voltage across terminals 22 and 16 will vary the amplitude of A.C. power applied to load 10. Because of the parallel paths, load current will flow during the complete cycle. While there may be some distortion due to transistor non-linearity, the shape of the load current approaches a sine wave. The output impedance of the D.C. source is designed to be low enough and the level of voltage across terminals 22 and 16 is sufficient to cause operation of transistors 14 and 18 in their active region.

One application where the invention is particularly useful is for electronic dimming control of a light source. Inserting a lamp energizable from an A.C. source as the load 10, its light output may be adjusted by varying the potential across terminals 22 and 16. By increasing the voltage, the base currents of the transistors are proportionately increased to decrease the series impedance of the collector-emitter paths and increase the power to the lamp and its light output. Conversely, by decreasing the control voltage, the light output of the lamp is reduced. Thus, with a control voltage smoothly variable over an appropriate range, the light output may be continuously varied from full rated illumination to essentially zero light output.

FIG. 2 illustrates the incorporation of the invention in a regulated power supply employing a closed loop regulator wherein the D.C. control signal is a sample of the voltage developed across an output load. In this case the load 10 is the primary winding of a transformer 30, the output of the secondary 32 of which is rectified and applied across a load 34. A sample of the voltage appearing across the load is applied to a direct current error amplifier 36 which converts it to an amplified current change which is inversely proportional to the voltage change. This current signal is applied to terminal 22 to control the base current of transistors 14 and 18, and terminal 16 is maintained at an appropriate voltage for forward biasing the emitters of the transistors relative to their base and collector.

If the voltage across the load 34 tends to increase, the increase in the sample or error signal causes a decrease in the control current at terminal 22, and in the base current of the transistor, causing the impedance of the collector-emitter paths of the transistors to increase. As a result, the amplitude of the A.C. voltage applied to the primary winding 10 is decreased to counteract the tendency of the load voltage to increase. The converse is true when the load voltage tends to decrease. As in the circuit of FIG. 1, current flows in the primary 10 throughout the complete cycle of the input wave and is of substantially the same waveform. It will be understood that the output impedance of amplifier 36 should be sufficiently low to drive transistors 14 and 18, and the output current therefrom of a value appropriate to enable the transistors to control the current flowing through primary winding 10.

The invention has been successfully used in the regulated power supply of FIG. 2 wherein 115 volt, 400 c.p.s. power was applied to the primary 10 and about 60 watts delivered at the load 34 over the range of 950 to 1250 volts D.C. Using type 2N424 transistors and type 1N649 diodes, the circuit regulated load voltages to within 1% over a range of about 950 to 1250 volts, from no load to full load (0–5 ma.) and a temperature range of —65° C. to +100° C. The amplifier 36 delivered about 150 ma. to the control transistors, 75 ma. to each base electrode.

While the invention has been described in connection with a single-phase power supply, it may also be utilized in a multi-phase supply by connecting the circuit of FIG. 1 in series with the load associated with each phase. Also, although NPN transistors have been suggested, with suitable modification of the circuit, transistors of the PNP type may be used without departing from the spirit of the invention.

What is claimed is:

1. A circuit for regulating the power delivered to a load from a source of alternating current potential having first and second output terminals, said circuit comprising, a connection from said first output terminal to one terminal of said load, first and second parallel conduction paths connected between the other terminal of said load and said second output terminal, each of said paths comprising a first diode, a transistor having collector, emitter and base electrodes, and a second diode connected in series, the cathode of said first diode being connected to the collector of the transistor and the anode of said second diode being connected to the emitter of the transistor in its corresponding conduction path, the anode of said first diode in said first conduction path being connected to said other terminal of said load and the anode of said first diode in said second conduction path being connected to said second output terminal, means to apply a forward biasing potential to the emitter of both said transistors, means to apply substantially equal direct current potentials to the base electrodes of both said transistors for controlling the collector-to-emitter impedance of said transistors and for continuously maintaining the emitter electrodes of both said transistors forward-biased with respect to the base electrodes of both said transistors, and means to correspondingly vary said direct current potentials to obtain a predetermined output power.

2. For regulating the power delivered to a load having first and second terminals from a source of alternating current potential having first and second terminals, a circuit comprising, a connection from the first terminal of said source to the first terminal of said load, first and second conduction paths, each including a unidirectional conducting device and a transistor connected in series, connected in parallel with each other between the second terminal of said load and the second terminal of said source, said unidirectional conducting devices in said first and second paths being oppositely poled, a source of direct current potential, means connecting said source of direct current potential to the transistor in each of said conduction paths, said transistors being operative in response to variations in the amplitude of said direct current potential to vary the impedance of said first and second conduction paths and to cause current through said load to flow continuously throughout the complete cycle of the applied alternating current potential, and means to vary the amplitude of said direct current potential to obtain a predetermined output power.

References Cited in the file of this patent

UNITED STATES PATENTS 2,813,244    Guggi _____ Nov. 12, 1957

FOREIGN PATENTS 1,058,615    Germany _____ June 4, 1959